July 12, 1960

S. N. MONK 2,944,780

FURNITURE JOINT

Filed May 27, 1958

INVENTOR
STERLING NORRIS MONK

BY

ATTORNEY

United States Patent Office 2,944,780
Patented July 12, 1960

2,944,780

FURNITURE JOINT

Sterling Norris Monk, 5919 Field Stone Road, Richmond 24, Va.

Filed May 27, 1958, Ser. No. 738,132

2 Claims. (Cl. 248—221)

This invention relates to a new and useful improvement in a joint and more particularly to such a device adapted to combine with supporting means to bear or sustain members, such as shelves, for instance, in a bookcase.

One of the objects of this invention is the provision of a joint adapted for anchorage or engagement with supporting means adapted to accommodate shelves or the like.

Another object of this invention is the provision of a joint adapted for use in combination with supports and shelves so that various useful articles may be quickly assembled in a stable or secure manner.

A further object of this invention is the provision of a joint adapted for use with supporting means and shelves so assembled as to form useful articles such, for instance, as a bookcase.

A still further object of this invention is the provision of a joint for use in combination with a support so as to support a shelf or the like and thereby form a useful article or articles without the use of securing means such as nails or the like.

Other objects and features will more fully appear from the following description and accompanying drawings, in which.

Figure 1:
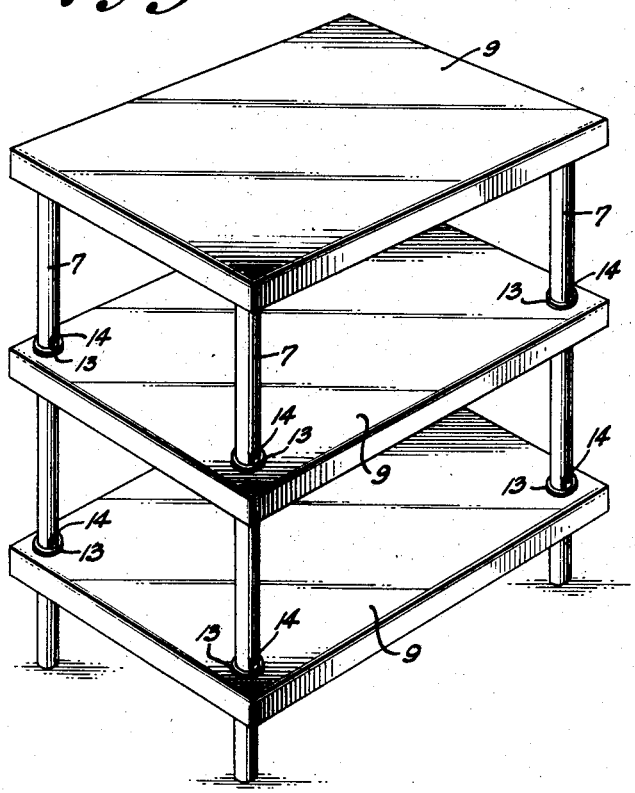
Fig. 1 is a front perspective of a bookcase formed with the novel joint therein.

It is to be understood that the embodiment of the bracket with a bookcase, as disclosed herein, is for illustrative purposes and that the furniture joint may be used for any supporting means that may be adaptable to any particular article.

Referring more particularly to the drawings the joint is designated by the numeral 1 and consists of sections 2 and 3 adapted to register with each other. Each section of the joint is constructed in similar fashion. The top portion of the joint is provided with an inturned lip 4 that extends inwardly and at right angles to a body 5. A supporting flange 6 is secured to and extends outwardly at right angles to said body.

A stanchion or leg 7 is provided with a groove 8 disposed in said leg in circumferential fashion. The inturned lips 4—4 of sections 2 and 3 are respectively adapted to engage said groove thereby allowing the body 5 of each section to depend downwardly therefrom and to nestle snugly about the leg. Each of the supporting sections 6 extend outwardly at right angles from their respective body portions and the leg. What has been said with respect to the joint and leg is equally applicable, of course, to a plurality of joints and legs.

A board or shelf 9 is provided with apertures 10 one adjacent each corner. For instance, as illustrated in Fig. 1, the two lowermost shelves are each provided with four apertures (one in each shelf not shown) and when the joints are respectively registered with the grooves in each of the legs, the latter are adapted to extend through said apertures and bear upon supporting flanges of each section 6. It is thought obvious that the apertured shelves are adapted to fit snugly against the body 5 of each joint to prevent lateral displacement of the lip with respect to the leg.

The top shelf shown in Fig. 1 is also provided with openings or recesses 10; that do not extend entirely through the shelf; but the top shelf is supported in similar fashion as are the other shelves hereinbefore described. It is thought obvious that by not extending the openings or recesses through the top shelf, a top shelf is provided that has an unbroken upper surface.

Now the foregoing description is illustrative of a circular joint provided for engagement with a round leg or stanchion. However, within the realm of equivalents, the joint may be made square, triangular or in any suitable shape to engage with a particular type of stanchion it must be used with. Furthermore, while the joint has been shown in two sections, only one section is necessary for supporting means, and the lip may be so constructed as to be disposed in a hole or the like.

Figure 2:
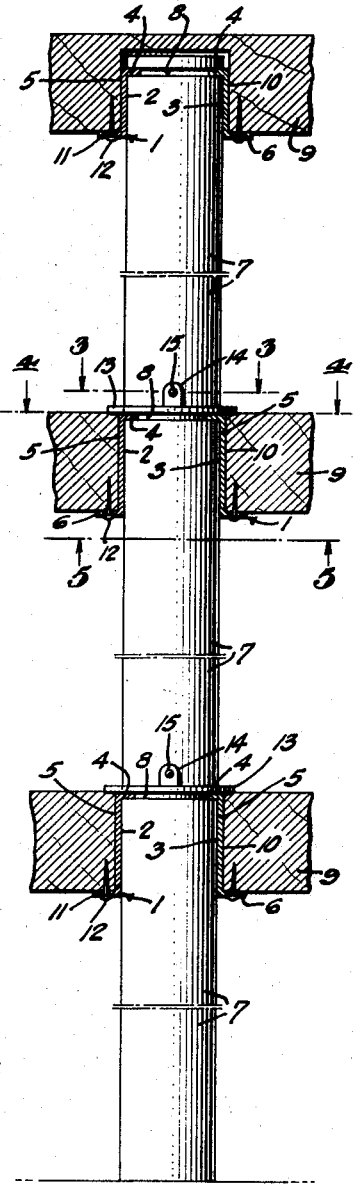
Fig. 2 is a vertical sectional view of one of the legs clearly showing the arrangement of the supporting joint.
Figure 3:
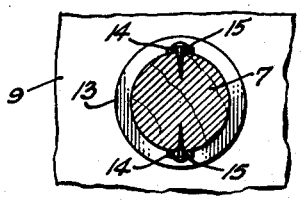
Fig. 3 is a sectional view taken on the line 3—3 of Fig. 2.
Figure 5:
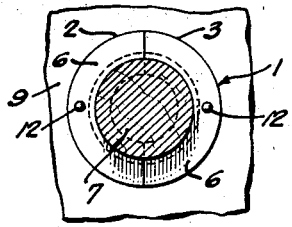
Fig. 5 is a sectional view taken on the line 5—5 of Fig. 2.
Figure 4:
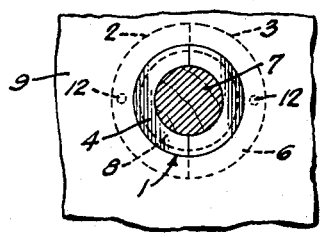
Fig. 4 is a sectional view taken on the line 4—4 of Fig. 2.

Each section of the bracket may be provided with holes 11 (see Fig. 2) adapted to accommodate nails 12 which may be driven into the companion shelf and thereby prevent vertical displacement with respect to the latter and said leg. Also similar vertical displacement and swaying or rocking of the shelf may be retarded by the provision of a finishing or stabilizing washer 13 provided with lugs 14 each having an orifice 15 for accommodating a nail or the like that may be driven into the leg. It is to be expressly understood, however, that this joint may be used without the use of nails or the like, and such preventive displacement means are merely shown for supplemental purposes.

It is also to be observed that the lips of the brackets are preferably adapted to flush with the surface of its companion shelf. It is thought obvious that by the provision of a bracket as hereinbefore described a bookcase, in this instance may be quickly and easily assembled without the use of any other securing device.

Having described this invention, what is claimed is:

1. In furniture construction, comprising a joint construction, said construction comprising sections arranged in opposed but in mating aligned relation to each other and surrounding and embracing a coextensive leg member, said leg member having a transverse groove therein, said sections having flanges extending into said groove, said sections also being provided with outwardly extending flanges to engage a supported means.

2. In furniture construction, comprising a joint construction, said construction comprising similar sections arranged in opposed but mating aligned relation to each other surrounding and embracing a coextensive leg member, said leg member having a transverse groove therein, said sections having flanges extending into said groove, said sections also having outwardly extending flanges to engage a supported means, in combination with a finishing and stabilizing ring snugly embracing said coextensive leg member.

References Cited in the file of this patent

UNITED STATES PATENTS

| | | |
|---|---|---|
| 1,220,447 | Onken | Mar. 27, 1917 |
| 1,358,322 | McIntosh | Nov. 9, 1920 |
| 2,730,419 | Watrous | Jan. 10, 1956 |

FOREIGN PATENTS

| | | |
|---|---|---|
| 281,702 | Switzerland | July 1, 1952 |